INVENTORS
KARL-HEINZ WESSEL
KLAUS SCHEIKOWSKI

United States Patent Office 3,555,617
Patented Jan. 19, 1971

---

3,555,617
INJECTION MOLDING APPARATUS
Karl-Heinz Wessel and Klaus Scheikowski, Hannover, Germany, assignors to Herr Friedrich Stubbe
Filed Mar. 4, 1968, Ser. No. 710,283
Claims priority, application Germany, Mar. 3, 1967, St 26,579
Int. Cl. B29f 1/00
U.S. Cl. 18—30                                                                 8 Claims

ABSTRACT OF THE DISCLOSURE

An injection molding apparatus for polymeric materials having a plurality of molds each of which receives, in turn, an injection of the polymeric material from an injection nozzle, wherein there is provided a novel aligning means including corresponding concave-convex means on the molds and on the injection nozzle for self-alignment, flexible supporting means for the injection nozzle to allow the nozzle to move slightly in the self-aligning process, and abutting means for preventing axial movement of the nozzle during the injection step.

---

Figure 1:
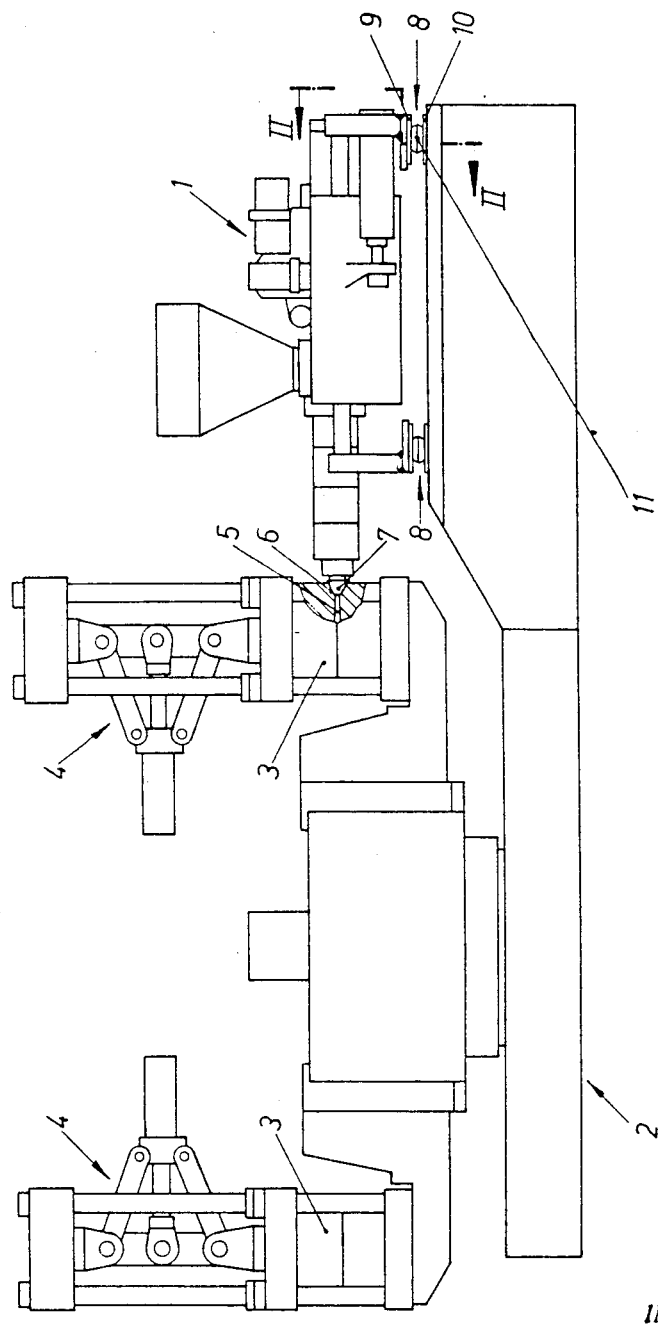

This invention relates to an injection molding apparatus. More particularly, the invention relates to an injection molding apparatus having a plurality of rotatable molds for receiving injections of polymeric materials from an injection nozzle, wherein the apparatus is provided with a novel aligning means for said molds and said nozzle.

In all injection molding apparatus wherein an injection molding composition is to be discharged from an injection nozzle into a sprue channel mouth of the mold or the like, the injection nozzle must be aligned precisely with the sprue channel mouth and pressed fast against it. This precise aligning of the nozzles with the sprue channel mouth often presents considerable difficulty, especially when using automatic turntable machines with a plurality of molds or stations in which the individual molds are rotated or turned to position them before the nozzle. The precise alignment of the molds and the injection nozzle in such a machine presents a considerable problem since there are always slight differences between the sprue channel mouth and the nozzle position. This is due on the one hand to the fact that it is not very simple, when there are a plurality of molds, to center each sprue channel mouth of each mold with the nozzle; on the other hand, however, it has also been found in practical work that the pivoting angle of the individual stations relative to the nozzle cannot be absolutely precisely reproduced, i.e., there are always deviations in the pivoting angles of the individual stations relative to the nozzle due mainly to the driving mechanism of the turntable, which can never operate with adequate precision owing to the paly which is always present in machinery of this nature.

In addition, the setting of the nozzle in automatic turntable machines is also easily upset during the course of the production process. Since the turntable is not always mounted in the plane of the nozzle, when the nozzle is pressed onto the sprue channel mouth, the turntable mounting is subjected to some moment and thus a tilting movement is brought about in accordance with the bearing play which is always provided. The nozzle is also tilted by the same moment which tilted the mold-mountings so that during each injection step it may be moved out of its plane. Consequently the nozzle does not always retain its position or return precisely to a predetermined position due to the varying amounts of these movements.

The use of round headed nozzles is known in the art. The convex exterior surface of such a nozzle fits into a correspondingly recessed sprue channel mouth in the mold. It is possible with such round headed nozzles to overcome to some extent the problem of incorrect alignment since if a round headed nozzle does not run precisely concentrically against the sprue channel mouth of the mold, a certain amount of self-centering of the nozzle with respect to the injection channel in the mold is achieved. However, with hitherto known devices of this kind there is considerable disadvantage in the fact that such self-centering may result in a considerable amount of wear on the nozzle, on the injection apparatus, on the sprue channel mouth of the mold and, in some instances, on the mold carriers such as the turntables or the like.

It is, therefore, an object of the present invention to provide a novel injection molding apparatus.

It is another object of the invention to provide an improved injection molding apparatus which is capable of self-alignment of the injection nozzle and the molds without a large amount of wear on the contacting surfaces of these parts.

Still further objects can be gathered from a reading of the following descriptions.

In accordance with the above objects, the present invention provides an injection molding apparatus which, while retaining and even promoting the advantageous self-centering effect of round headed nozzles, obviates their disadvantages and overcomes all hitherto known difficulties in aligning the nozzle with the sprue channel mouth of the mold. According to the invention, the above objects are achieved by providing injection molding apparatus which is supported by means of elastically constructed feet, e.g., rubber-metal feet. The apparatus further bears on the support by means of an abutment which is stationary but which permits horizontal and vertical pivoting movements of the apparatus.

As a result of the construction according to the present invention, the entire injection molding apparatus with its injection nozzle can be pivoted both in the vertical and in the horizontal directions but cannot carry out any kind of axial movement in the direction of the nozzle axis. The abutment provides the rigid mounting for the injection molding apparatus in the axial direction of the nozzle which is necessary for the application of pressure between nozzle and sprue channel mouth. At the same time the abutment acts, in conjunction with the elastic feet, as a bearing point for pivoting movements of the apparatus in all directions. Thus when the injection nozzle is pressed against the sprue channel mouth of an injection molding mold, self-centering is guaranteed in a very simple manner without any substantial forces being developed. Due to this construction, the extent of self-centering hitherto possible with round headed nozzles is substantially increased while at the same time the considerable wear on the parts which has hitherto occurred is very substantially reduced.

The ideal point for the abutment on the injection molding apparatus is a point on the nozzle axis to the rear of the nozzle, since in that case when the nozzle is pressed against the sprue channel mouth of an injection molding mold, no moments can act on the injection molding apparatus—if it is assumed that the injection molding mold cannot carry out any considerable tilting movements. Therefore, the spacing of the bearing point of the abutment from the nozzle axis on the apparatus should be kept as small as possible. In automatic turntable machines wherein the main deviations from correct centering are due to the turntable rotating through an imprecise pivoting angle, it is expedient to locate the bearing or force application point of the abutment on the injection molding apparatus at a short distance vertically below the nozzle axis.

The abutment can be constructed in various ways. In a simple and advantageous embodiment, the abutment is so arranged that a stationary stay bolt is connected by means of a self-aligning roller bearing to the injection molding apparatus.

Figure 2:
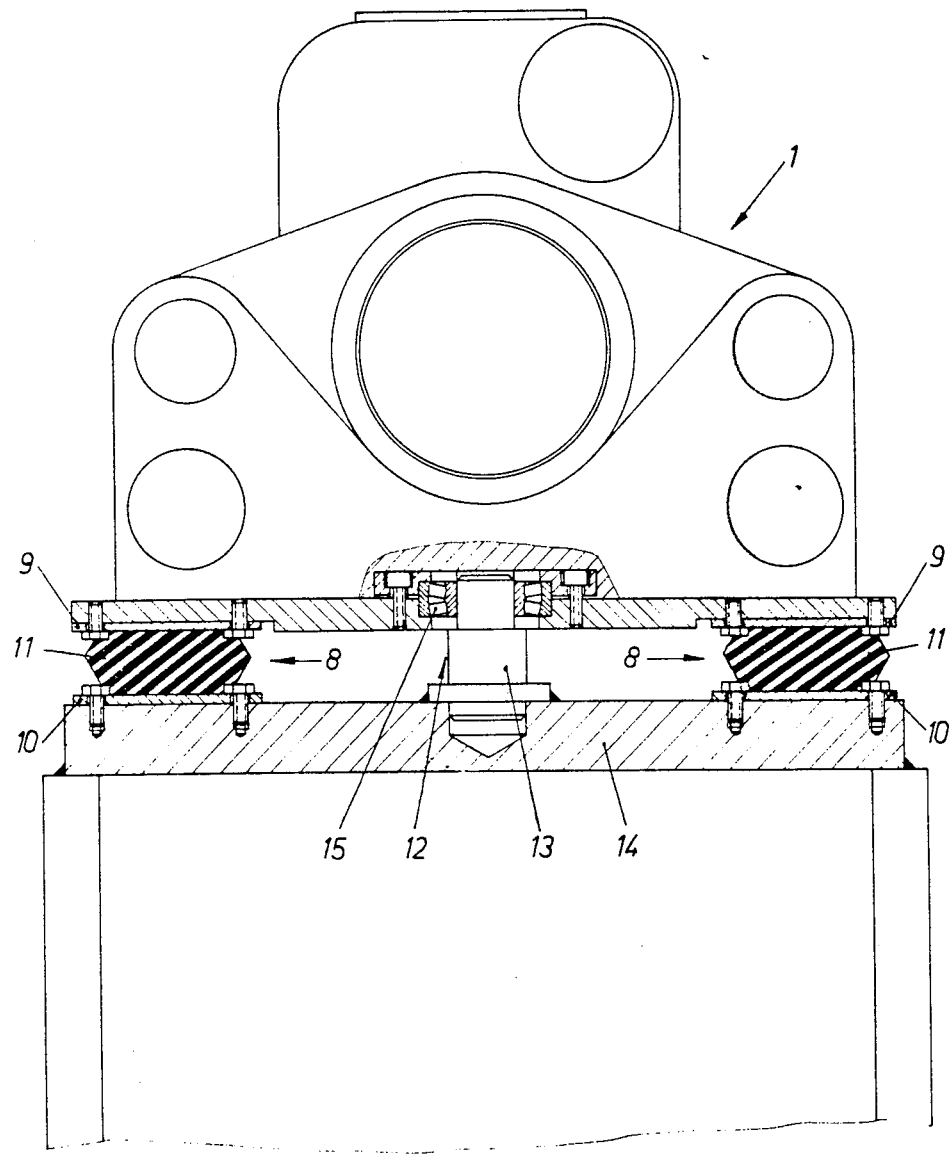

Further details and advantages of the invention will be explained in more detail hereinafter in one specific embodiment with reference to the drawings wherein:

FIG. 1 shows a schematic elevation view of an injection molding apparatus and a rotatable circular table connected therewith for the conveyance of the injection molding molds; and FIG. 2 is a sectional view through the injection molding machine along line II—II of FIG. 1.

The illustrated injection molding apparatus 1 is of generally conventional construction. It co-operates with a rotatable circular table 2 whereby a plurality of injection molding molds 3 are transported in succession to the front of the injection molding apparatus 1. In the illustrated example, two such injection molding molds are illustrated but in practice a table of this kind can, of course, comprise many more stations and can have correspondingly many molds. The injection molding mold 3 in the illustrated example comprises two mold halves which are situated one above the other and which can be opened and closed by means of a closing device 4 which is only diagrammatically shown.

At the plane of division between the two mold halves of mold 3, there is a sprue channel 5 which opens into a mouth 6 directed towards the injection molding apparatus. The mouth 6 is constructed with a hemispherical, conical or otherwise concave recess. The injection nozzle 7 of the injection molding machine is constructed as a round headed nozzle having a convex exterior corresponding in shape to the concave recess of the sprue channel mouth 6.

The injection molding apparatus 1 is supported on rubber-metal feet each of which comprises two metal plates 9 and 10 vulcanized onto a rubber pad 11. In this way the entire injection molding apparatus is elastically supported, i.e., the entire apparatus including the injection nozzle can carry out slight pivoting movements in the horizontal and vertical senses and, where appropriate, slight tilting movements in a lateral sense. However, movement in the direction of the nozzle axis towards the rear, looking from the point of the injection nozzle, is prevented by a stationary abutment 12 (shown in FIG. 2), so that despite the elastic support of the injection molding apparatus 1 the injection nozzle 7 can be pressed with considerable pressure against the sprue channel mouth 6 of the particular injection molding mold 3 in each case.

In the illustrated example, the abutment 12 comprises a stationary stay bolt 13 which is secured to the support 14. This stay bolt 13 is connected by way of a self-aligning roller bearing 15 to the injection molding apparatus 1. Due to the presence of this self-aligning roller bearing, the abutment can act as a fixed bearing point for the horizontal and vertical pivoting movements and possible tilting movements of the injection molding apparatus.

With the injection molding apparatus constructed as described hereinbefore, when the injection nozzle 7 is moved towards mold 3, due to the pivotability of the injection molding apparatus 1 and the hemispherical or conical or otherwise concave shape of the sprue channel mouth 6, the injection molding apparatus 1 and the injection nozzle 7 can be centered very easily relatively to the sprue channel mouth. Due to the yielding nature of the elastic supports, only small frictional forces can develop during the aligning process, so that wear on the injection nozzle 7 and the sprue channel mouth 6 remains imperceptibly slight.

It will be understood that the invention is not limited to the illustrated embodiment. Thus, for example, it is possible to use only two rubber-metal feet, namely the feet situated nearest the injection nozzle 7, and merely to support the injection molding machine at the rear end at the abutment. It is also possible to use, instead of the rubber-metal feet, other elastic elements such as springs or the like. The abutment also need not have a self-aligning roller bearing, but may also comprise, for example, a simple ball and socket joint in which a ball-headed pin is used. It would also be possible to arrange the force application point of such a ball joint at another location, for example directly on the nozzle axis.

The injection molding apparatus constructed according to the invention can be used advantageously not only in connection with turntables, but also can be advantageously used with injection molding machines having only a single mold; since in such a machine when molds are interchanged, the time consuming precise adjusting and aligning operation normally required for centering the injection nozzle with the sprue channel mouth is dispensed with.

Another modification of the above illustrated embodiment can be made by having the concave recess on the injection nozzle and the mating convex projection on the mold.

Although rubber support has been mentioned above as the elastic support for the injection molding apparatus, it is clear that other elastomeric materials can be used.

We claim:

1. In a horizontal injection molding machine comprising a base, an injection molding apparatus having a nozzle for injecting a molding composition mounted thereon, and a mold for receiving said composition generally aligned with said apparatus, the improvement which comprises means for self-aligning mating concave recess and convex projection surfaces of said nozzle and said mold, in combination with said apparatus and said mold, which self-aligning means includes:

(a) means for elastically mounting said apparatus on said base to provide for slight pivoting movements along horizontal and vertical axes of said apparatus and slight lateral tilting movements of said apparatus,
   (b) abutting means for preventing movement of said apparatus axially of said nozzle mounted on said base,
   (c) means for pivotally receiving said abutting means disposed in said apparatus to permit pivotal movement thereof and for providing a fixed bearing point for said horizontal, vertical and tilting movements of said apparatus.

2. The machine according to claim 1 wherein there are a plurality of molds each rotatably mounted for engagement with said nozzle.

3. The machine according to claim 2 wherein said elastic mounting means comprises a plurality of supports made from an elastomeric material.

4. The machine according to claim 3 wherein said elastomeric material is rubber.

5. The machine according to claim 2 wherein said abutting means is located at a point on the axis of the injection nozzle.

6. The machine according to claim 2 wherein said abutting means is located at a point slightly below the axis of the injection nozzle.

7. The machine according to claim 2 wherein said pivotal receiving means is a self-aligning roller bearing means.

8. The machine according to claim 2 wherein said abutting means comprises a retention member secured at one end to said base for said apparatus, and is adapted at the other end in the form of a ball and said pivotal receiving means is a socket type joint for receiving said ball.

References Cited

UNITED STATES PATENTS 3,169,900   12/1964   Hvelskamp _____ 18—30I

FOREIGN PATENTS 12,474   9/1962   Japan _____ 18—30I

ANDREW R. JUHASZ, Primary Examiner

M. O. SUTTON, Assistant Examiner